United States Patent
Gantz et al.

(10) Patent No.: US 7,428,429 B2
(45) Date of Patent: Sep. 23, 2008

(54) HANDS-FREE PERSONAL COMMUNICATION DEVICE

(75) Inventors: Christopher C. Gantz, Northbrook, IL (US); Mandy M. Johnson, Milwaukee, WI (US); Allan G. Mlodzikowski, Muskego, WI (US)

(73) Assignee: SYNC1 LLC, Northbrook, IL (US)

( * ) Notice: Subject to any disclaimer, the term of this patent is extended or adjusted under 35 U.S.C. 154(b) by 486 days.

(21) Appl. No.: 11/029,911

(22) Filed: Jan. 5, 2005

(65) Prior Publication Data

US 2005/0153750 A1 Jul. 14, 2005

Related U.S. Application Data

(63) Continuation-in-part of application No. 10/218,277, filed on Aug. 14, 2002, now Pat. No. 6,934,567.

(60) Provisional application No. 60/535,314, filed on Jan. 9, 2004.

(51) Int. Cl.
*H04B 1/38* (2006.01)
(52) U.S. Cl. .............. 455/575.1; 455/90.3; 455/344
(58) Field of Classification Search .......... 455/575.1, 455/575.2, 575.3, 575.4, 575.6, 569.1, 90.3, 455/344, 347, 348, 349, 350, 351; 381/364; 379/430

See application file for complete search history.

(56) References Cited

U.S. PATENT DOCUMENTS

| | | | |
|---|---|---|---|
| 3,983,483 A | 9/1976 | Pando | |
| 4,070,553 A | 1/1978 | Hass | |
| 4,084,139 A | 4/1978 | Jakobe | |
| 4,322,585 A | 3/1982 | Liautaud | |
| 4,485,276 A | 11/1984 | Sato | |
| 4,685,448 A | 8/1987 | Shames et al. | |
| 4,764,962 A | 8/1988 | Ekman et al. | |
| 4,864,646 A | 9/1989 | Nesbit et al. | |
| 4,993,065 A * | 2/1991 | Chiou | 379/430 |
| 5,212,734 A | 5/1993 | Tsao | |
| 5,457,751 A | 10/1995 | Such | |
| 5,563,951 A | 10/1996 | Wang et al. | |
| 5,617,477 A | 4/1997 | Boyden | |
| 5,680,465 A | 10/1997 | Boyden | |
| 5,682,434 A | 10/1997 | Boyden | |
| 5,687,245 A | 11/1997 | Boyden | |
| 5,701,356 A | 12/1997 | Stanford et al. | |
| 5,757,929 A | 5/1998 | Wang et al. | |
| 5,761,298 A | 6/1998 | Davis et al. | |
| 5,815,579 A | 9/1998 | Boyden | |
| 5,867,582 A | 2/1999 | Nagayoshi | |

(Continued)

FOREIGN PATENT DOCUMENTS

EP   1 223 682 A1   7/2002

(Continued)

*Primary Examiner*—Blane J Jackson

(57) ABSTRACT

A hands-free personal communication device is worn about a user's neck. The communication device includes an elongated elastic neckband for supporting the communication device about the user's neck. The elastic neckband has memory characteristic and is bendable along its length such that the neckband is formable into and out of various selectable positions. An acoustic output device is attached to the neckband and positioned near an ear of the user when the communication device is worn about the user's neck. A microphone is attached to an end of the neckband. A detachable earbud may be attached to an end of the neckband.

33 Claims, 8 Drawing Sheets

U.S. PATENT DOCUMENTS

| | | |
|---|---|---|
| 5,887,066 A | 3/1999 | Nakagawa |
| 5,956,630 A * | 9/1999 | Mackey .................... 455/344 |
| 6,018,585 A | 1/2000 | Akino et al. |
| 6,178,251 B1 * | 1/2001 | Luchs et al. ............... 381/364 |
| 6,233,345 B1 | 5/2001 | Urwyler |
| 6,236,969 B1 | 5/2001 | Ruppert et al. |
| 6,252,970 B1 | 6/2001 | Poon et al. |
| 6,345,751 B1 | 2/2002 | Elliot |
| 6,519,345 B1 | 2/2003 | Yang |
| 6,594,370 B1 * | 7/2003 | Anderson .................. 381/315 |
| 6,707,924 B1 * | 3/2004 | Okiebisu .................. 381/385 |
| 6,721,579 B2 * | 4/2004 | Liu ........................ 455/569.1 |
| 7,257,422 B2 * | 8/2007 | Loprete .................. 455/550.1 |
| 2002/0173346 A1 * | 11/2002 | Wang ....................... 455/568 |
| 2004/0048639 A1 * | 3/2004 | Obolo ..................... 455/575.1 |
| 2004/0082359 A1 * | 4/2004 | Choi et al. ............... 455/556.1 |
| 2004/0180631 A1 * | 9/2004 | Lim et al. .................. 455/90.3 |
| 2005/0286717 A1 * | 12/2005 | Viduya et al. ............... 379/430 |

FOREIGN PATENT DOCUMENTS

| | | |
|---|---|---|
| WO | WO 03/055183 A1 | 7/2003 |

* cited by examiner

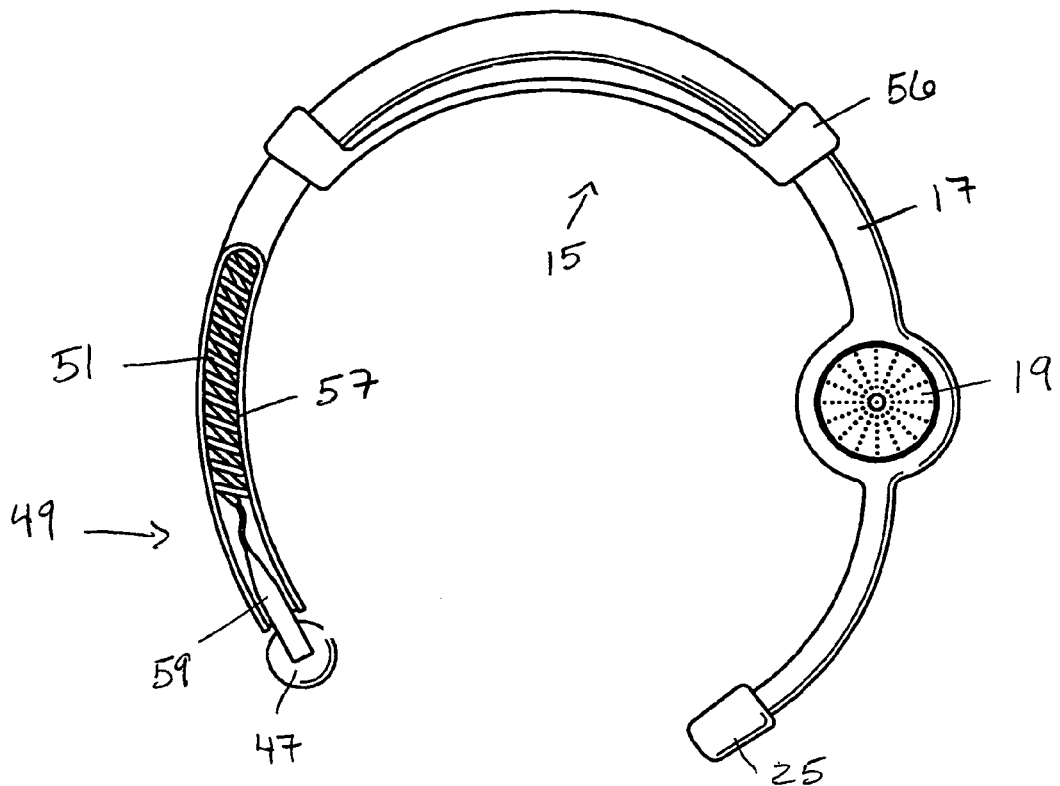
FIG. 9
FIG. 10
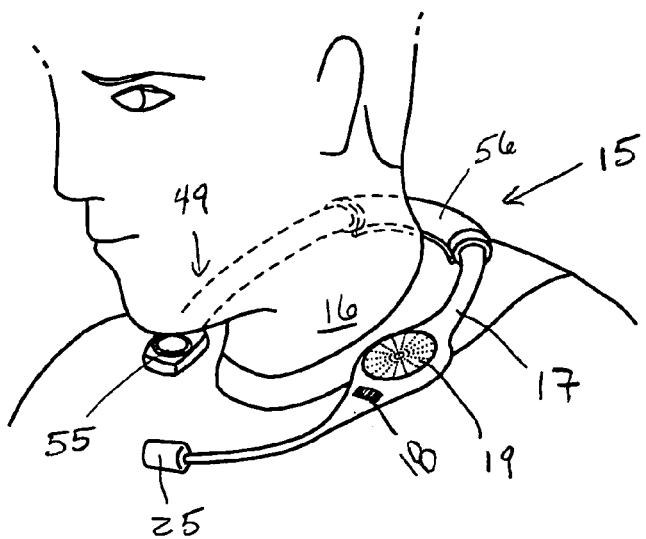

HANDS-FREE PERSONAL COMMUNICATION DEVICE

CROSS REFERENCE TO RELATED APPLICATION

This application is a continuation-in-part of U.S. patent application Ser. No. 10/218,277, filed on Aug. 14, 2002 now U.S. Pat. No. 6,934,567. This application also claims the benefit of U.S. Provisional Application No. 60/535,314, filed Jan. 9, 2004.

FIELD OF THE INVENTION

The present invention relates to the field of hands-free personal communication devices. More specifically, the present invention relates to a hands-free personal communication device that is worn about a user's neck.

BACKGROUND OF THE INVENTION

Hands-free personal communication devices are used in a variety of known professional and personal settings. In general, hands-free personal communication devices are useful for any application wherein it is desired to provide one-way or two-way communication while leaving the users' hands free to perform various other tasks. Hands-free personal communication devices are used by, for example, telephone operators and multimedia users who receive and/or send communications using the device and at the same time, use both hands for other tasks.

Headsets are a well-known example of hands-free personal communication devices. Headsets are typically worn on the user's head and have opposing speakers, one for each ear of the user, attached by a headband which extends over the top of the user's head. These devices may also include a boom which has one end attached to the headband and a second end that contains a microphone. The boom is often flexible and contains memory characteristic such that the boom is positionable into and out of various selectable positions.

A significant drawback to known headsets is that they are often uncomfortable to wear and can become entangled with or mess up the user's hair. Known headsets are also not as adjustable as is often desired and are typically rigid such that they do not fit a wide range of users having different body proportions. Because most headsets are arranged to be in constant contact with the user's ears and/or head, many users complain of head and/or ear discomfort.

U.S. patent application Ser. No. 10/218,277 by the present inventor Christopher Gantz, the disclosure of which is incorporated herein by reference, discloses a personal wearable communication and speaker system that is wearable about a user's neck. The communication and speaker system includes a gripping neckband attached to a speaker housing and an adjustable microphone support arm. The gripping neckband is rotatable about an axis by 180° to convert from a left-eared configuration to a right-eared configuration, and vice versa. A pad is attached to the distal end of the gripping neckband relative to the speaker housing. In a particular embodiment, the speaker housing can be disengaged from its base and automatically switched to a headphone mode wherein the speaker is mounted on the user's ear.

The above described patent application solves many of the above described problems with known headsets. However, further improvements upon this device are still desired. For example, it is desirable to provide an improved device that is more easily adjusted to fit a wide variety of body types and sizes. It is further desirable to provide a device that is more easily adjusted between headphone and ear phone use.

As such, it is desirable to provide an improved hands-free personal communication device that overcomes the shortcomings of known devices. It is desirable to provide a communication device that is self-supporting and adjustable to fit individuals having different body proportions. It is desirable to provide such a communication device that is easy to put on and take off. It is desirable to provide a hands-free communication device which is adjustable to fit either a left or right side of the user. It is desirable to provide such a device that eliminates head and ear discomfort often associated with many known headsets. It is further desirable to provide such a communication device that maintains or improves the acoustic output and input quality and performance of current known devices.

SUMMARY OF THE INVENTION

The present invention is a hands-free personal communication device that overcomes many shortcomings of known devices.

The hands-free personal communication device includes an elongated elastic neckband which supports the communication device about the user's neck. The neckband has memory characteristic and is bendable along its length, or at least part of its length, such that the neckband is positionable into and out of various selectable positions. An acoustic output device is attached to the neckband and positioned near an ear of the user when the communication device is worn about the user's neck. A microphone is attached to a first end of an elastic boom attached to the neckband.

The hands-free personal communication device may also include an earphone or earbud attached, for example, to the second end of the neckband. The earphone is detachable from the neckband such that the earphone is insertable into an ear of the user when the communication device is worn about the user's neck. An electrical connection provides communication to and from the earphone and microphone.

The hands-free personal communication device of the present invention may be easily adjusted and fitted so as to be worn comfortably and in firm and stable fashion around the neck, just at or above the shoulders, of a user. It has the advantage of not being in direct contact with the more sensitive areas of the body, such as the ear and head or scalp. The present invention includes an ergonomic alternative to a traditional headset or earset. The device of the present invention places a speaker and microphone combination on or near the intersection of the user's neck and shoulder, thereby eliminating the need for any sort of contact with or mounting to the user's head or ear. The freedom of movement and rotation provided by the elastic and memory characteristics of the neckband provide significant advantages where mobility, stability and comfortable fit are desired.

Furthermore, one embodiment of the present invention allows the user to place a detachable earbud in the user's ear, if desired. By this arrangement, the user can easily disengage the earbud from the elastic neckband and insert it into the user's ear for more private conversations. In addition, the hands-free personal communication device can include a switch and/or a control module to change the output of the device from loudspeaker mode to headphone mode in order to eliminate the need to control the volume when the user temporarily (for momentary privacy concerns, for example) places the earbud into the user's ear. The switch may be manual or the device may be configured to automatically switch to headphone mode when the earbud is utilized.

BRIEF DESCRIPTION OF THE DRAWINGS

The drawings illustrate the best mode presently contemplated of carrying out the invention.

In the drawings:

FIG. 9 is a top view of an alternate embodiment of the hands-free personal communication device;

FIG. 10 is a perspective view of an alternate embodiment of the hands-free personal communication device worn about a user's neck.

DETAILED DESCRIPTION OF THE PREFERRED EMBODIMENTS

In the preferred embodiments of the present invention described in detail below, a hands-free personal communication device is provided. It should be understood that the drawings and specification are to be considered an exemplification of the principles of the invention, which is more particularly defined in the appended claims.

Figure 1:
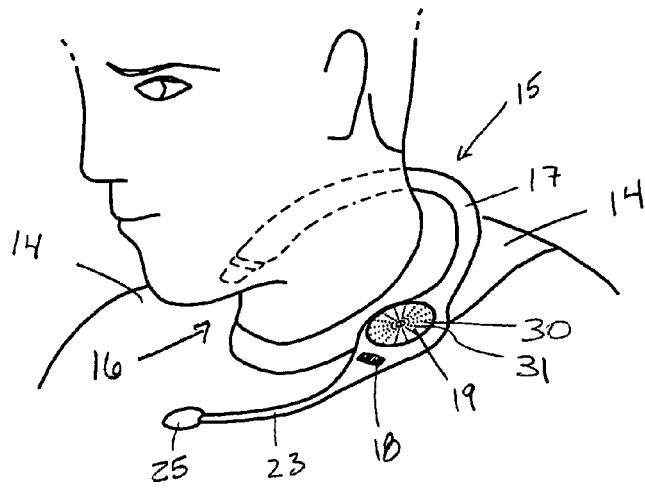
FIG. 1 is a perspective view of the hands-free personal communication device worn about a user's neck.
Figure 2:
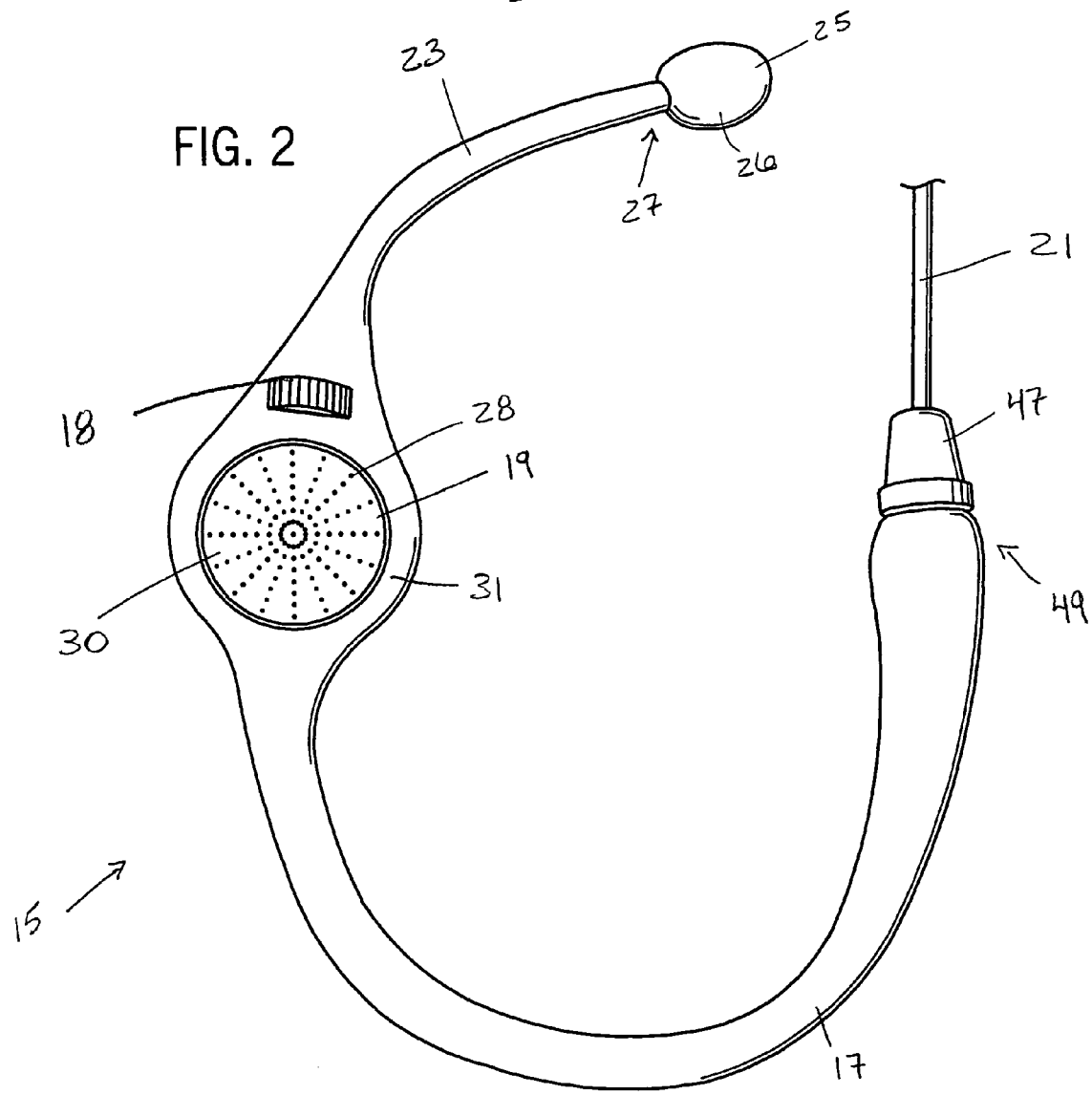
FIG. 2 is a top view of a first embodiment of the hands-free personal communication device.

Referring to FIGS. 1 and 2, a preferred embodiment of the hands-free personal communication device is shown. A neckset 15 includes an elongated elastic neckband 17 for supporting the neckset 15 about a user's neck. The elastic neckband 17 is bendable and/or twistable along at least part of its length and has memory characteristic such that when the neckband 17 is moved into a certain position it retains that position. In this manner, the shape and position of the neckband 17 can be changed such that it comfortably fits around a user's neck. This also allows the various audio components carried by the neckband 17 (which are described in more detail below) to be positioned in a location where they will not interfere with, for example, a user's chin or mouth. As shown in FIG. 1, the neckband 17 is worn around the user's neck 16 and rests on either the user's shoulders 14, or on the area where the shoulders 14 meet the neck 16. Because the neckband 17 is bendable and/or twistable along its length and has memory characteristics, it can be shaped to properly fit around the user's individual physique such that it has stability and is comfortable to wear.

Referring now to FIGS. 1, 2, 7 and 8, in a particular embodiment, the elastic neckband 17 includes a bendable wire 20 or metal tube and a flexible rubber coating 22, preferably comprising a thermo plastic elastomer. However, it should be recognized that the elastic neckband 17 may comprise any one of a variety of known materials that are flexible and have memory characteristics such that the neckband 17 is positionable into and out of a variety of positions along its entire length, or alternately along a portion thereof.

An acoustic output device or speaker 19 is integrally attached to the elastic neckband 17 and resides within a speaker housing 31. The speaker 19 receives audio and electrical input from speaker audio/power cord 21 and may comprise any one of a variety of audio speakers known in the art. The speaker 19 however should be capable of providing sufficient audio output such that a user may hear the audio output when the neckset 15 is worn about the user's neck and the speaker housing is resting on the user's shoulder, as will be described further below, and as is shown in FIG. 1. The audio output of the speaker 19 is controllable by a volume control, which in the embodiment shown is a rotary member 18.

Referring to FIGS. 1 and 2, a speaker screen 30 covers the speaker 19 and protects the speaker 19 from damage. Speaker screen 30 is preferably made of metal and includes a series of holes 28 which allow audio from the speaker 19 to pass through the speaker screen 30.

Audio/power cord 21 provides audio and electrical signals to the neckset 15 and includes a 2.5 millimeter plug that is connected to the speaker housing 31 by a strain relief (not shown). Strain relief provides strength and durability to the connection and is preferably formed of a notched cone-shaped rubber piece that provides a flexible and durable connection. It will also be recognized by those skilled in the art that the neckband 17 may include a wireless transmitter instead of the audio/power cord 21. Such an arrangement would also include a separate power source, such as for example a battery, for powering the various audio components provided with the device.

Figure 7:
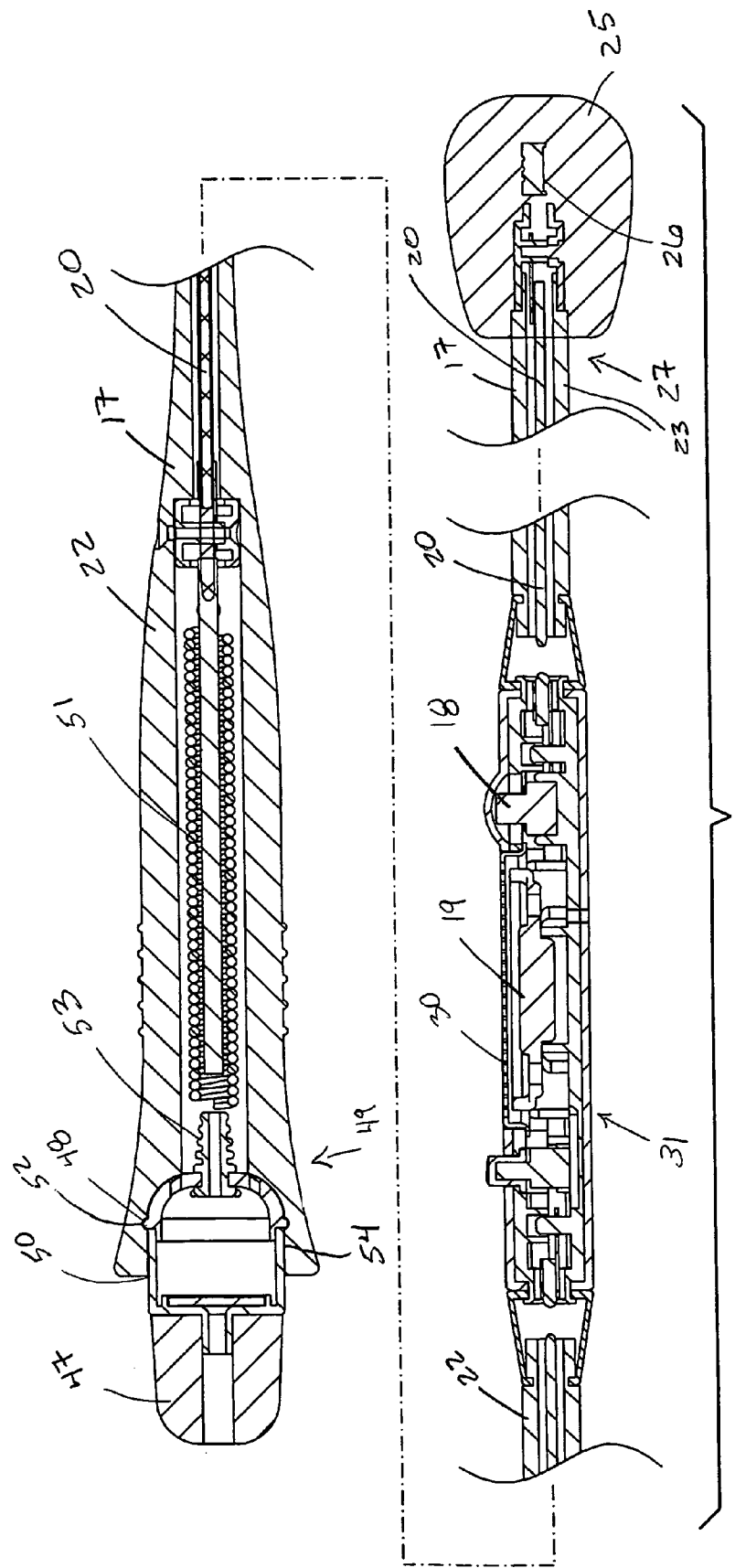
FIG. 7 is a detailed sectional side view of the hands-free personal communication device.
Figure 8:
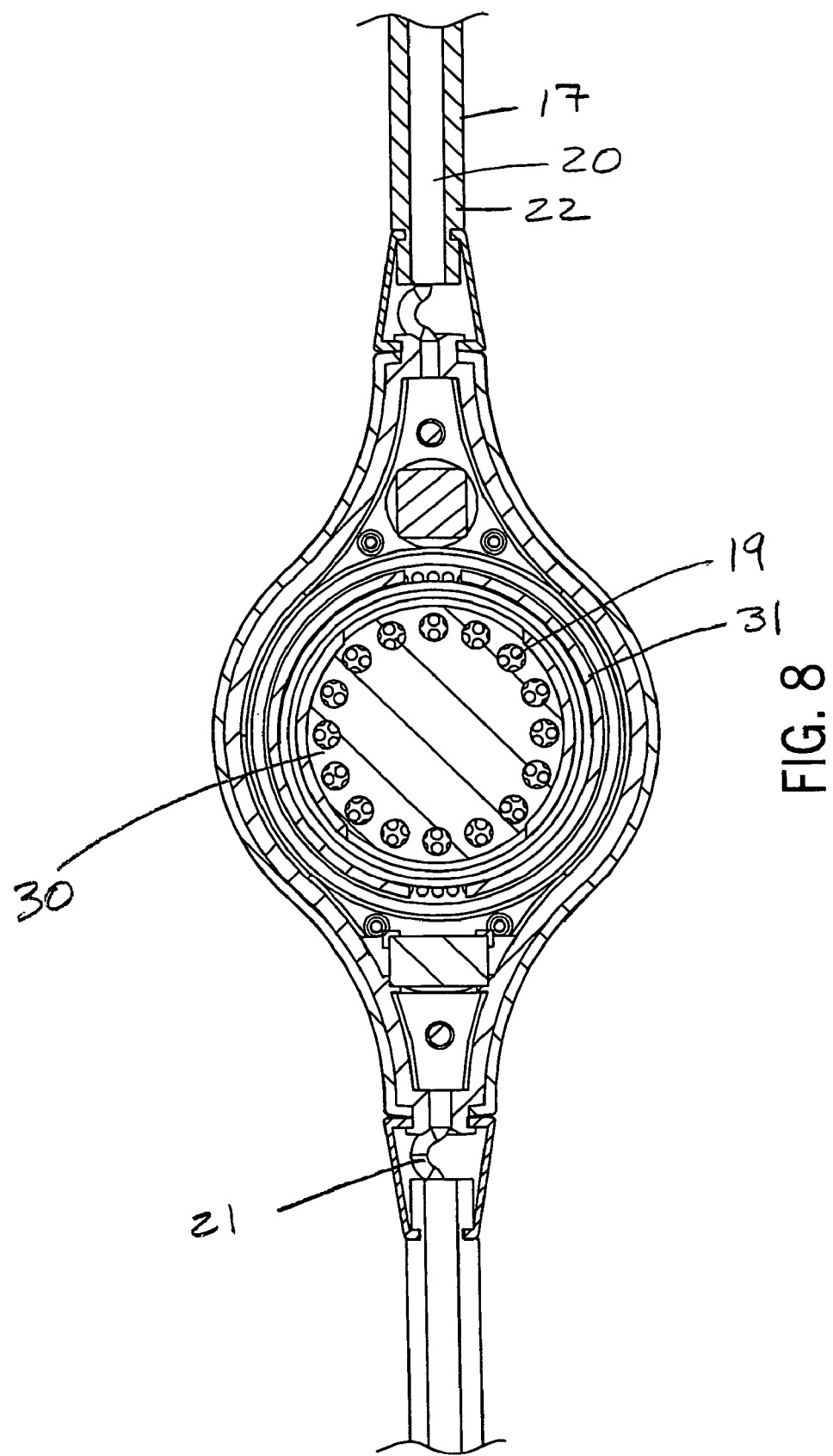
FIG. 8 is a sectional top view of the audio component.

As shown in FIGS. 1, 2 and 7, the neckset 15 further includes a bendable boom arm 23 having a microphone 25 attached to its distal end 27 relative to the speaker 19. The bendable boom arm 23 is preferably constructed of bendable material such as wire, a flexible memory plastic, or metal tube 20 and a flexible rubber coating 22, preferably including a thermal plastic polymer. The boom arm 23 is positionable into and out of a variety of positions along its entire length, or a portion thereof. The microphone 25 is attached to the end of the boom arm 23 and consists of any one of a variety of known microphones for receiving sound from an external source. The microphone 25 is encased by a foam covering 26 to protect the microphone 25 from wind noise and yet still allow for audio pickup. The boom arm 23 is thus positionable such that it can be easily moved to various positions and will stay where it is moved. This allows the microphone 25 to be positioned in a location where it will not interfere with the user's mouth or chin, and yet allows the microphone 25 to be moved close to the user when the user wants to speak softly and still be heard.

Figure 3:
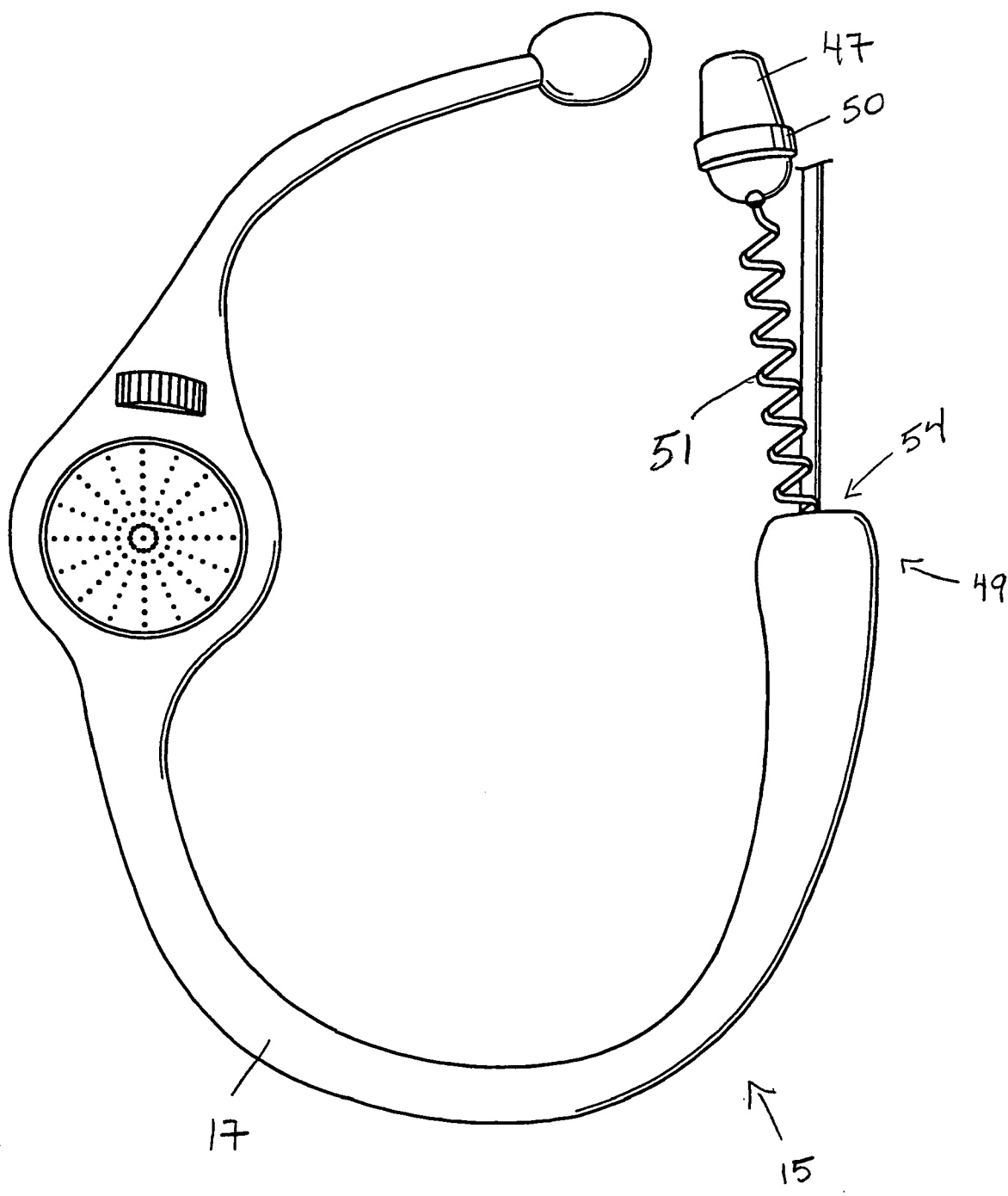
FIG. 3 is a top view of the hands-free personal communication device shown in FIG. 2, wherein the earbud is removed.

Referring now to FIGS. 3 and 7, the illustrated embodiment of the neckset 15 includes a detachable earphone, which is often referred to in the art as an earbud 47. The earbud 47 is releaseably attached to the distal end 49 of the elastic neckband 17. The earbud 47 is detachable from the elastic neckband 17 and yet remains connected to the elastic neckband 17 by a retractable power/audio cord 51. According to this arrangement, the earbud 47 is easily removed from the elastic neckband 17 and reattached to the elastic neckband 17. In the embodiment shown, retractable power/audio cord 51 resides within an open-faced cavity 54.

The earbud 47 and neckset 15 may alternately include wireless transmitters and the earbud 47 may include a power source. In such an arrangement, the power/audio cord 51 would not be necessary, as the earbud 47 would be capable of wirelessly transmitting with the neckset 15. The earbud 47 provides many advantages that will be recognized by one skilled in the art. The earbud 47 provides privacy to one using the neckset 15. The earbud 47 also increases the ability of the user to hear the audio output as compared to the speaker 19. This is particularly true if the neckset 15 is used in a crowded and/or noisy environment.

Referring to FIG. 7, the distal end 49 of the elastic neckband 17 defines an open-ended cavity 54 for releaseably receiving and retaining the earbud 47. According to this arrangement, the side portions 44 of the open-ended cavity 54 are flexible such that the earbud 47 is easily inserted into and removed from the cavity 54 on the elastic neckband 17. In the embodiment shown, the earbud 47 has an outwardly protruding collar 48 that is sized and shaped to be received in a snap-fit arrangement by an annular groove 52 on the interior of the cavity 54, to thereby securely and releasably retain the earbud 47 in the cavity 54. Various other releasable connections may be employed, such as for example an arrangement where the earbud 47 is sized and shaped to be press-fit into the cavity 54.

In the embodiment shown, retractable power/audio cord 51 resides within the open-ended cavity 54, in such a manner that easy retraction and deployment of the power/audio cord 51 and earbud 47 are possible. In FIG. 7, the power/audio cord is shown in its retracted state as the earbud 47 is nested in the open-ended cavity 54. The power/audio cord 51 is attached to the earbud 47 by a strain relief 53, which provides strength and durability to the connection and is preferably formed of a notched cone-shaped rubber piece and provides a flexible and durable connection.

Figure 6:
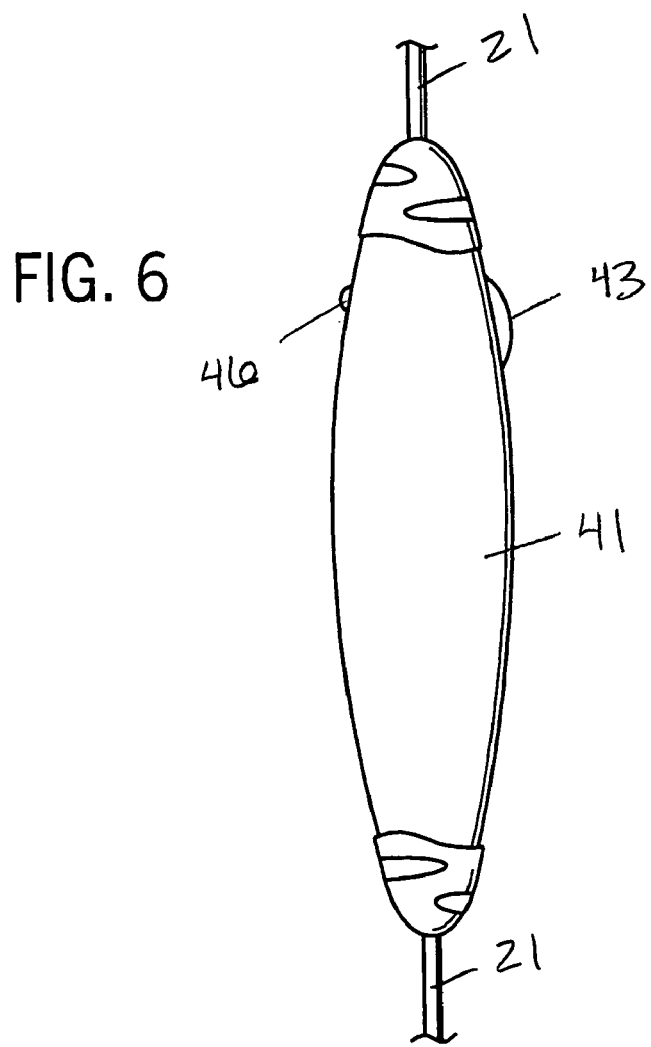
FIG. 6 is a detailed view of the control module.

In use, the earbud 47 is detached from the neckset 15 and inserted into a user's ear, thus providing audio to the user. Removal of the earbud 47 from the neckset 15 may automatically cause the speaker 19 to stop producing audio, or alternatively, the earbud 47 and speaker 19 may be controlled by a control module 41 (shown in FIG. 6). The control module 41 is arranged to control the volume of speaker 19. More specifically, the control module 41 includes volume control, which, in the embodiment shown, is a manually operable rolling member 43. In addition, the control module 41 may include an on/off switch 45 for selectively providing electrical power to the neckset 15, including the speaker 19 and microphone 25. The control module 41 preferably further includes an amplifier (not shown) for electrically driving the audio input to speaker 19 and from microphone 25. The module 41 may further include means from providing power to the neckset 15, such as for example a battery.

Figure 4:
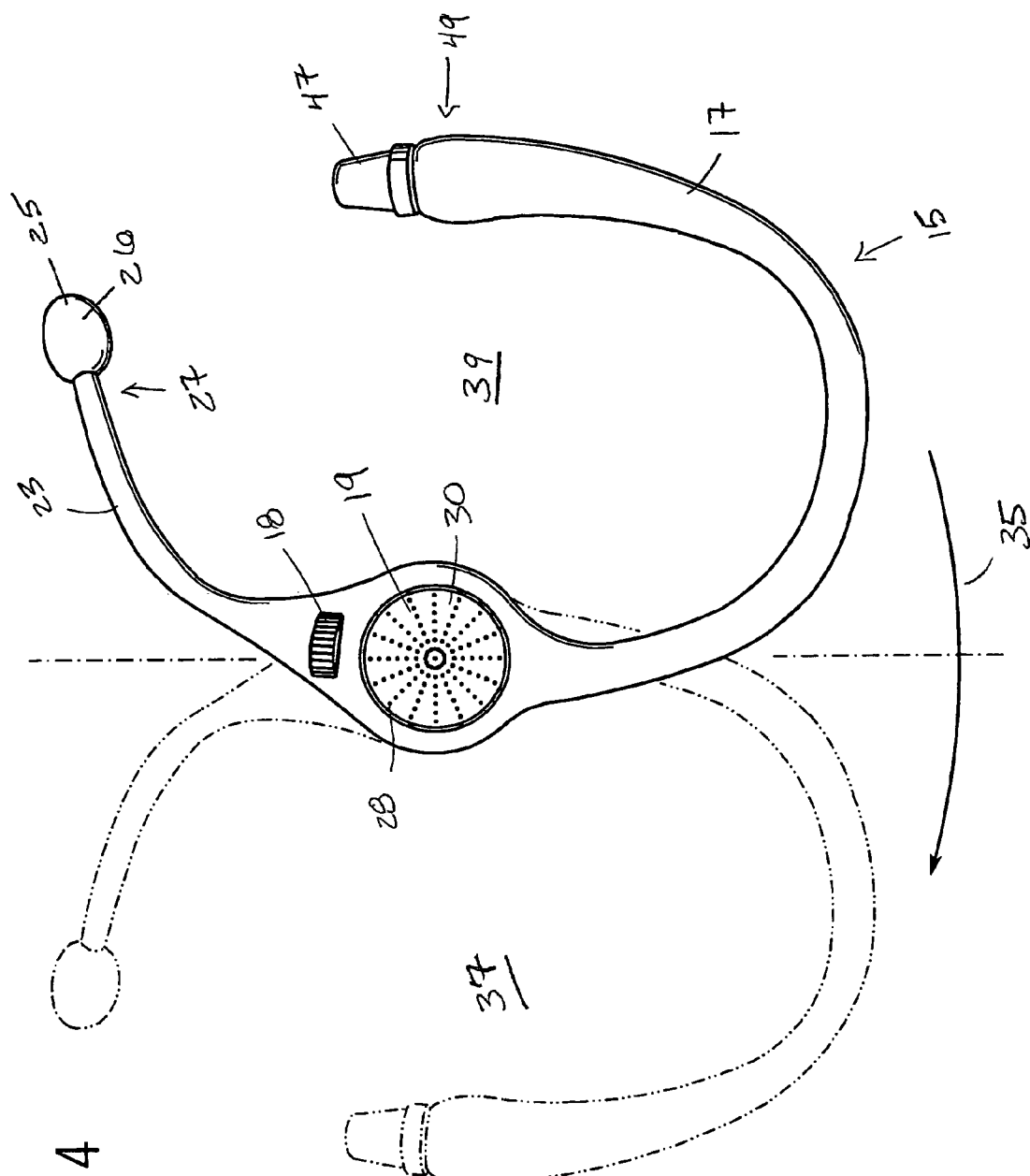
FIG. 4 is a top view of the device, depicting the memory characteristic and bendability of the elongated elastic neckband.

Referring to FIG. 4, the neckset 15 is adjustable such that the speaker 19 may be positioned on either a left or right ear of the user. As shown by arrow 35, the elastic neckband 17 is adjustable 180 degrees about axis 36 such that the left 37 and right 39 configurations are possible. In addition to the configurations shown, the elastic neckband 17 is positionable such that the neckband 17 is sized to fit the individual user's physique. For example, if the user's neck is wide, the neckband 17 is positioned such that the speaker 19 and earbud 47 are further apart.

Figure 5:
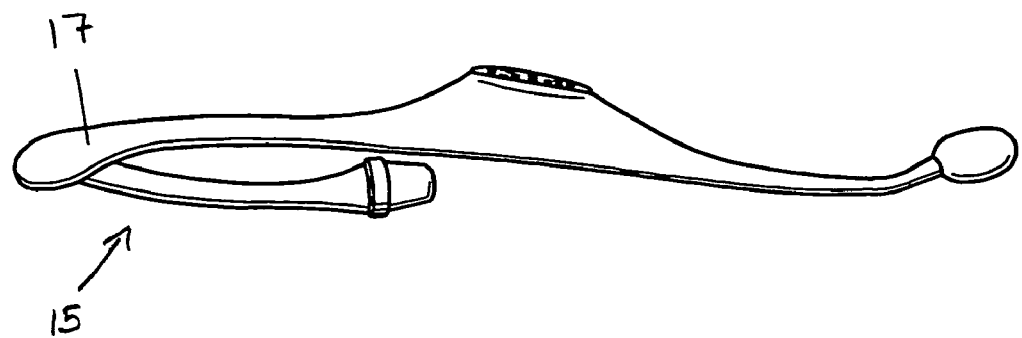
FIG. 5 is a side view of the hands-free personal communication device.

Referring to FIG. 5, the a side view of the neckset 15 is shown.

Figure 11:
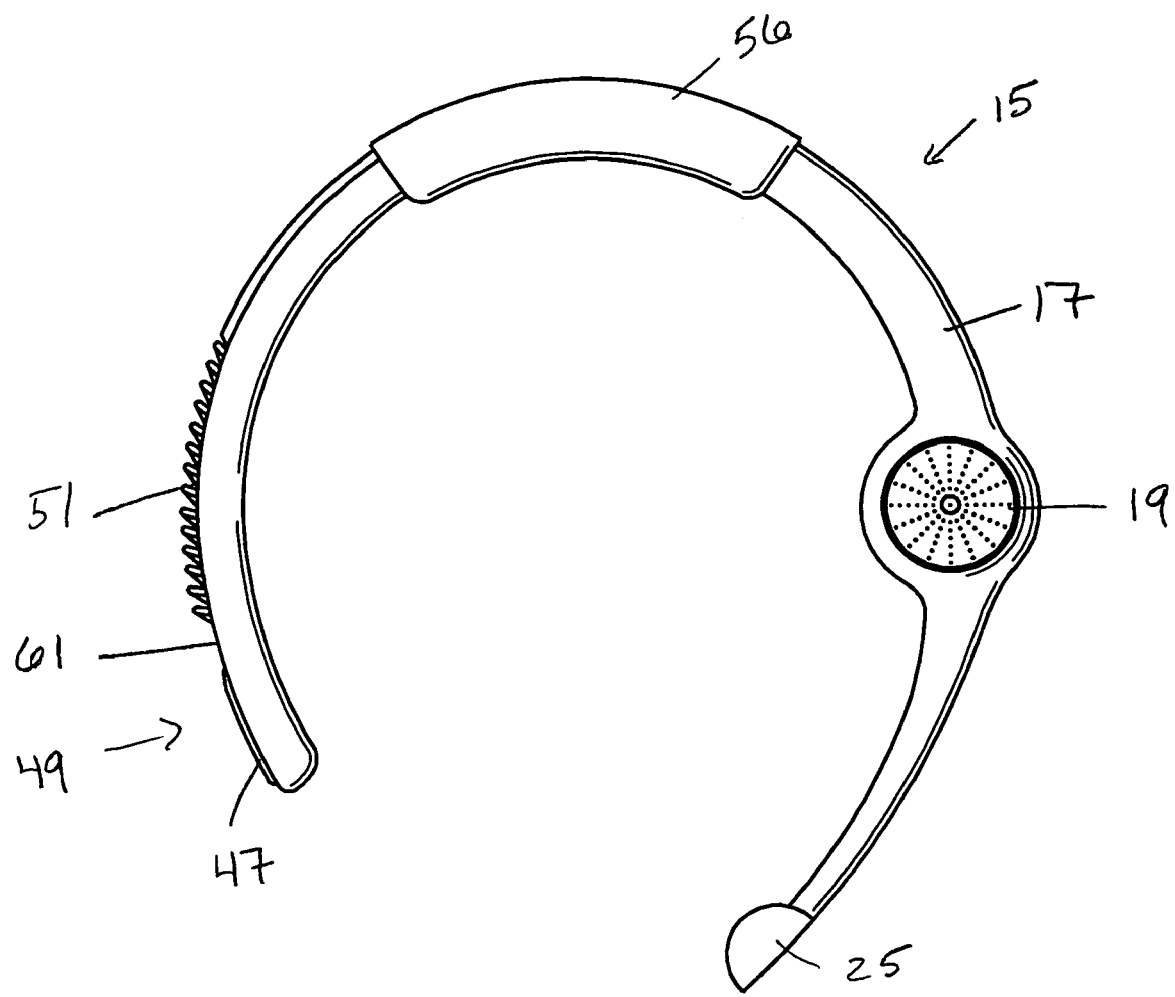
FIG. 11 is a top view of an alternate embodiment of the hands-free personal communication device.

The elastic neckband 17 may be provided with a neck brace 56 which can include a curved piece of flexible or stiff rubber (see FIG. 9) or plastic or soft foam sleeve (see FIG. 11). The neck brace 56 provides additional stability and form to the neckband 17 and assists the neckband 17 to fit properly around the user's neck.

Referring to FIG. 9, an additional embodiment of the neckset 15 includes an open-faced cavity 57, which is open along the distal end 49 of the neckband 17. The open-faced cavity 57 advantageously allows the power/audio cord 51 to extend in a direction transverse to the distal end 49 of the elongated neckband 17 when the earbud 47 is inserted in the user's ear.

In the particular arrangement shown in FIG. 9, the earbud 47 includes an elongated tapered member 59 that is sized slightly smaller than the width of the open-faced cavity 54. In this arrangement, the elongated tapered member 59 is press-fit into the open-faced cavity 54 to releaseably secure the earbud 47 to the distal end 49 of the neckband 17.

Referring to FIG. 10, it is further recognized that the distal end 49 of the neckband 17 may include an additional fixed speaker 55 in addition to or rather than the earbud 47. In such an arrangement, speakers 19, 55 are disposed on either side of the user's head and provide binaural sound to the user.

Referring to FIG. 11, an arrangement is shown wherein the distal end 49 of the neckband 17 includes a closed-ended open-faced cavity 61. In this arrangement, the earbud 47 is sized and shaped to fit within the closed-ended open-faced cavity 61 in a press fit manner, to releaseably attach the earbud 47 to the distal end 49 of the neckband 17.

It is recognized that the neckset 15 is useable in a variety of environments. As such, the speakers 19, 55, the earbud 47, and the microphone 25 may be designed such that they are waterproof. Referring briefly to FIG. 7, water repellant paper (not shown) may be provided on the microphone 25 to protect the microphone 25 from damage caused by moisture or water. In addition, the speaker housing 31 may include water repellant paper (not shown) which is preferably positioned on the top and bottom of the speaker 19 and/or inside the speaker screen 30 and the lower portion of the speaker housing 31. The water repellant paper prevents water from entering the speaker housing 31 and damaging the speaker 19.

It is also recognized that an embodiment of the neckset 15 may not include the earbud 47. In such an arrangement, the distal end 49 of the neckband 17 would form a weighted bud which offsets the weight of the speaker 19, boom arm 23 and microphone 25 when the neckset 15 is worn about the user's neck.

While this invention is susceptible to embodiments in many different forms, the drawings and specification describe in detail a preferred embodiment of the invention. They are not intended to limit the broad aspects of the invention to the embodiment illustrated.

What is claimed is:

1. A hands-free personal communication device for wearing about a user's neck, the communication device comprising:

an elongated elastic neckband for supporting the communication device about the user's neck, the neckband having memory characteristic and being bendable along its length such that the neckband is formable into and out of various selectable positions;

an acoustic output device attached to the neckband and positionable near an ear of the user when the communication device is worn about the user's neck, a microphone attached to a first end of the neckband; and an earphone attached to the neckband, wherein the neckband is adapted to store the earphone in a stored position when the earphone is not in use.

2. The hands-free personal communication device of claim 1, wherein the earphone is attached to a second end of the neckband and removable from the stored position such that the earphone is insertable into an ear of the user when the communication device is worn about the user's neck.

3. The hands-free personal communications device of claim 2, further comprising an electrical connection between the earphone and the communication device.

4. The hands-free personal communication device of claim 1, further comprising a battery.

5. The hands-free personal communication device of claim 1, further comprising a wired electrical connection.

6. The hands-free personal communication device of claim 1, further comprising a wireless electrical connection.

7. The hands-free personal communication device of claim 1, wherein the neckband comprises a cavity for storage of the earphone.

8. The hands-free personal communication device of claim 7, wherein the earphone is removable from the stored position and insertable into an ear of the user when the communication device is worn about the user's neck.

9. The hands-free personal communication device of claim 8, wherein the neckband comprises a cavity that facilitates retraction and deployment of an electrical wire connected to the earphone.

10. The hands-free personal communication device of claim 1, wherein the elastic neckband comprises a bendable wire and a flexible rubber coating.

11. The hands-free personal communication device of claim 1, further comprising a weighted boom attached to a second end of the neckband, the weighted boom of sufficient weight to offset the acoustic output device and microphone when the device is worn about the user's neck.

12. The hands-free personal communication device of claim 1, further comprising means for controlling the volume of the acoustic output device.

13. The hands-free personal communication device of claim 1, wherein the acoustic output device comprises an audio speaker.

14. The hands-free personal communication device of claim 1, further comprising a second acoustic output device attached to the neckband and positionable near another ear of the user.

15. The hands-free personal communication device of claim 1, further comprising a neck brace attached to the neckband to provide additional stability to the neckband.

16. The hands-free personal communication device of claim 1, wherein the acoustic output device is waterproof.

17. The hands-free personal communication device of claim 1, wherein the microphone is waterproof.

18. The hands-free personal communication device of claim 1, further comprising a neck brace attached to the neckband to provide additional stability to the neckband.

19. A hands-free personal communication device for wearing about a user's neck, the communication device comprising:
   an elongated elastic neckband for supporting the communication device about the user's neck;
   an acoustic output device attached to the elongated elastic neckband and positionable near an ear of the user when the communication device is worn about the user's neck; and
   an earphone attached to an end of the neckband,
   wherein the neckband is adapted to store the earphone in a stored position when the earphone is not in use and the earphone is removable from the stored position and insertable into an ear of the user when the communication device is worn about the user's neck.

20. The hands-free personal communication device of claim 19 wherein the earphone is attached to the communication device by an electrical cord having memory characteristic.

21. The hands-free personal communication device of claim 19, further comprising an electrical connection between the earphone and the communication device.

22. The hands-free personal communication device of claim 19, further comprising a battery.

23. The hands-free personal communication device of claim 19, further comprising a wired electrical connection.

24. The hands-free personal communication device of claim 19, further comprising a wireless electrical connection.

25. The hands-free personal communication device of claim 19, wherein the elastic neckband comprises a bendable wire and a flexible rubber coating.

26. The hands-free personal communication device of claim 19, further comprising a weighted boom attached to a second end of the neckband, the weighted boom of sufficient weight to offset the acoustic output device and microphone when the device is worn about the user's neck.

27. The hands-free personal communication device of claim 19, further comprising means for controlling the volume of the acoustic output device.

28. The hands-free personal communication device of claim 19, wherein the acoustic output device comprises an audio speaker.

29. The hands-free personal communication device of claim 19, wherein the neckband comprises a cavity that facilitates retraction and deployment of an electrical wire connected to the earphone.

30. The hands-free personal communication device of claim 19, further comprising a second acoustic output device attached to the neckband and positionable near another ear of the user.

31. The hands-free personal communication device of claim 19, wherein the acoustic output device is waterproof.

32. The hands-free communication device of claim 19, wherein the microphone is waterproof.

33. A hands-free personal communication device for wearing about a user's neck, the communication device comprising:
   an elongated neckband for supporting the communication device about the use's neck, the neckband having memory characteristic and being bendable along its length such that the neckband is formable into and out of various selectable positions;
   an acoustic output device attached to the neckband and positionable near an ear of the user when the communication device is worn about the use's neck;
   a microphone attached to a first end of the neckband;
   an earphone attached to an end of the neckband, the earphone being detachable from the neckband and insertable into an ear of the user when the communication device is worn about the user's neck; and
   a neck brace attached to the neckband to provide additional stability to the neckband.

* * * * *